June 9, 1953     R. L. G. JONES ET AL     2,641,269
FILTER CLEANING MACHINE

Filed March 13, 1950     2 Sheets-Sheet 1

R. Lee G. Jones
Stanley C. Okeon
INVENTORS

June 9, 1953  R. L. G. JONES ET AL  2,641,269
FILTER CLEANING MACHINE
Filed March 13, 1950  2 Sheets-Sheet 2

R. Lee G. Jones
Stanley C. Okeon
INVENTORS

Patented June 9, 1953

2,641,269

UNITED STATES PATENT OFFICE 2,641,269

FILTER CLEANING MACHINE

R Lee G. Jones, Beaumont, Tex., and Stanley C. Okeon, Memphis, Tenn.; said Okeon assignor to said Jones Application March 13, 1950, Serial No. 149,344

2 Claims. (Cl. 134—159)

This invention relates to new and useful improvements in agitator machines and the primary object of the present invention is to provide a machine for holding and agitating filters in a bath in order to properly clean the filters and to thereby permit the reuse of filters that are commonly discarded.

Another important object of the present invention is to provide a filter cleaning machine including a vertically rockable member supporting filters at both its ends and a small and compact mechanism for oscillating or rocking the member so that filters supported at its ends will be effectively agitated in a suitable bath or cleaning medium.

A further object of the present invention is the provision of a filter cleaning machine embodying filter holders so constructed as to permit filters to be quickly and readily applied thereto or removed therefrom in a convenient manner.

A still further aim of the present invention is to provide a machine for cleaning filters that is simple and practical in construction, strong and reliable in use, small and compact in structure, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
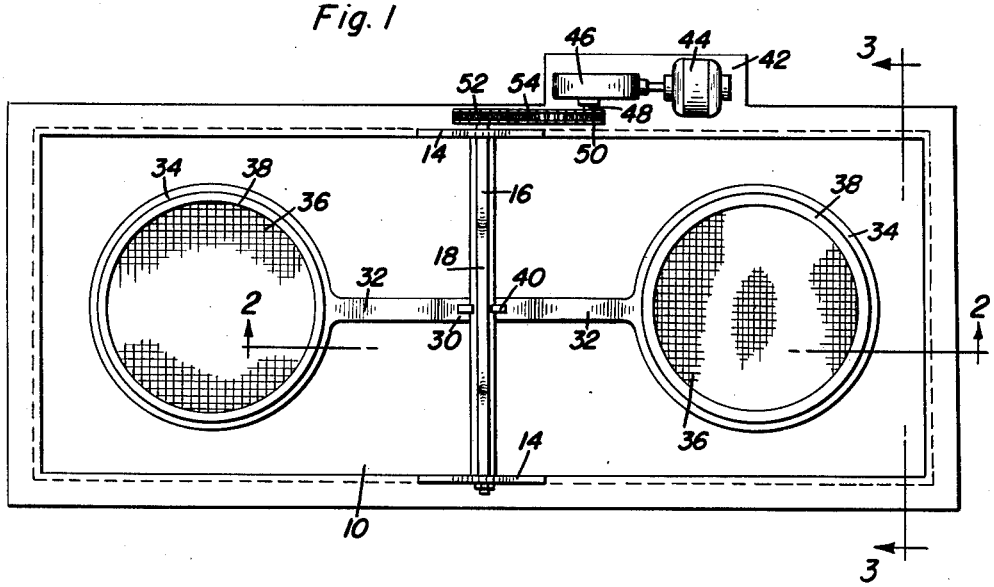
Figure 1 is a plan view of the present invention.
Figure 3:
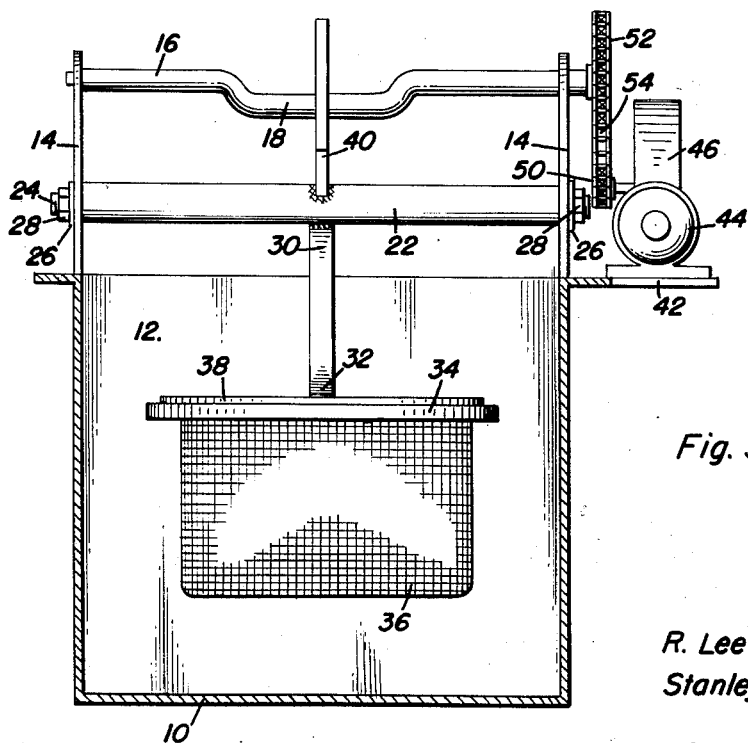
Figure 3 is an enlarged transverse vertical sectional view taken substantially on the plane of section line 3—3 of Figure 1.
Figure 2:
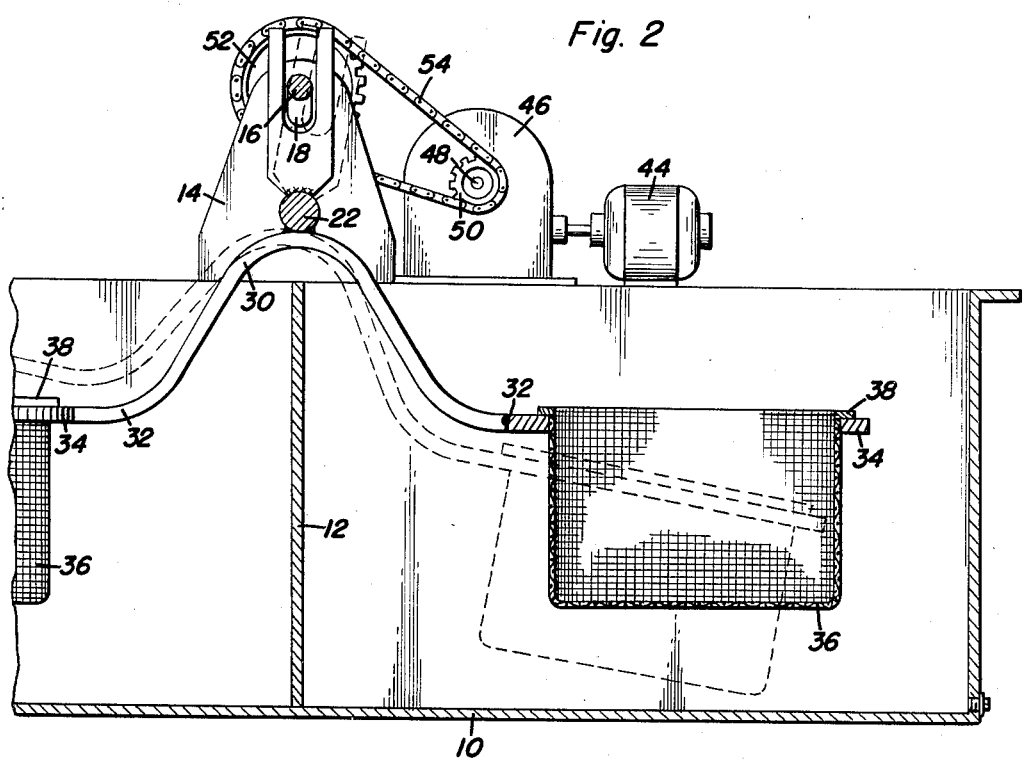
Figure 2 is an enlarged fragmentary longitudinal vertical sectional view taken substantially on the plane of section line 2—2 of Figure 1.

Referring now to the drawings in detail, wherein for the purpose of illustration, there is disclosed a preferred embodiment of the present invention, the numeral 10 represents a vat or container having a transverse partition 12 for dividing the vat into two compartments. A pair of side supports or members 14 rise from the side walls of the vat and rotatably support an upper power driven shaft 16 having a central crank portion or off-set portion 18 for a purpose which will later be more fully described.

Figure 4:
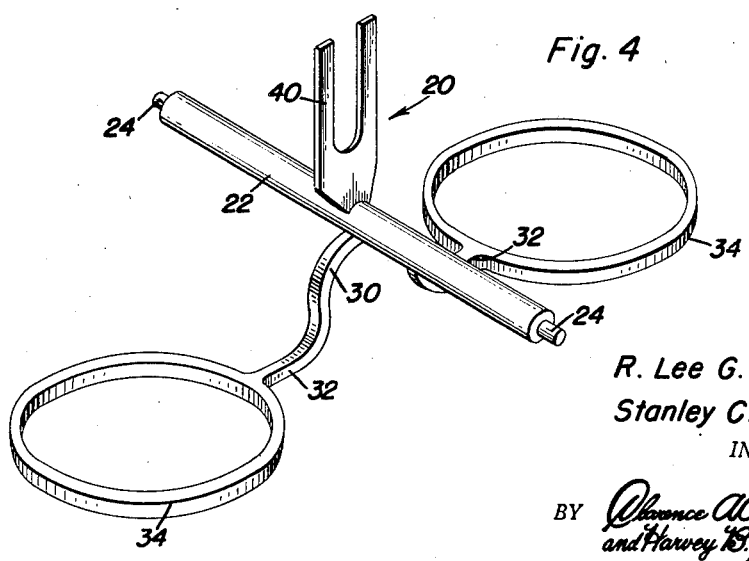
Figure 4 is a perspective view of the agitator or rocking member, used in the present invention, per se.

The numeral 20 represents the agitator member used in the present invention. The agitator 20, as shown per se in Figure 4, includes a lower shaft 22 having reduced end portions 24 that are received in suitable apertures in the side supports 14 for rotation. Washers 26 are mounted on the end portions 24 and are held close to the side supports by nuts 28 threaded on the end portions 24.

The web portion or central part of a substantially U-shaped member 30 is fixed by welding or the like to the undersurface of the shaft 22. The member 30 is disposed laterally of the shaft 22 and arms 32 integrally formed with the ends of the member 30 terminate in ring members 34 that receive baskets 36 having upper flanged portions 38 that rest upon the upper faces of the ring members 34.

The shaft 22 is disposed in spaced parallel relationship to the shaft 16 and beneath the shaft 16 and both the shafts 16 and 22 are disposed directly above the partition 12.

A bifurcated member or yoke 40 is fixed by welding or the like to the shaft 22 and rises from the shaft 22 to receive the crank portion 18 of the shaft 16. As the shaft 16 rotates, the crank portion 18 will alternately engage the furcations of the bifurcated member 40 to oscillate or rock the shaft 22 whereupon the baskets 36 will be raised and lowered in a suitable bath in the compartments of the vat 10.

A supporting wall 42 extends from the vat 10 and supports a motor 44 that is connected through reduction gearing 46 to a driven shaft 48. Sprockets 50 and 52 are mounted on the shafts 48 and 16 respectively, and are connected by a sprocket chain 54.

In practical use of the present invention a suitable cleaning medium or bath is placed in the vat 10 and filters (not shown) are placed in the baskets 36. As the motor 44 operates, the shaft 16 will rotate to oscillate the shaft 22 and agitate the baskets in the cleaning medium.

The ring members 34 and baskets 36 may be of any suitable shape, for example square or rectangular to conform to the shape of the filters inserted therein.

Obviously, the machine illustrated may be in multiple units, three or more placed side by side with a common upper shaft 16 having a crank portion for each vat and a common lower shaft for all vats having a member 30, arms 32, ring members 34 and baskets 36 for each vat. One of the vats will be used for washing of the filters, another for the rinsing of the filters and the third for the purpose of dipping the filters in a light oil.

A suitable vibrating table may be employed for shaking excess oil from the filters after they are removed from the third vat in the above assembly.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. In a filter cleaning machine including a power driven horizontal shaft having a crank portion, a horizontal rock shaft supported beneath the power driven shaft for rotation, a bifurcated member fixed to the rock shaft medially of the ends of the rock shaft and disposed transversely of the rock shaft and extending upwardly from the rock shaft, said crank portion being received between the furcations of said member to impart oscillation to said rock shaft during rotation of said power driven shaft, an inverted U-shaped holder fixed medially of its ends to the underside and central part of said rock shaft beneath said member, and means at the ends of said holder for holding filters.

2. In a filter cleaning machine comprising a vat, a pair of supports rising from the vat, upper and lower horizontal shafts journaled for rotation on said supports, means carried by the lower shaft for supporting filters, said upper shaft being power driven and including an offset portion, and a bifurcated member fixed to said lower shaft, said offset portion being received between the furcations of said member.

R. LEE G. JONES.
STANLEY C. OKEON.

References Cited in the file of this patent

UNITED STATES PATENTS

| Number | Name | Date |
|---|---|---|
| 788,862 | Walker | May 2, 1905 |
| 902,064 | Fetherolf | Oct. 27, 1908 |
| 1,112,552 | Powers | Oct. 6, 1914 |
| 1,363,493 | Chillemi | Dec. 28, 1920 |
| 1,387,173 | Powell | Aug. 9, 1921 |
| 1,573,977 | Lee | Feb. 23, 1926 |
| 1,593,417 | Barley | July 20, 1926 |

FOREIGN PATENTS

| Number | Country | Date |
|---|---|---|
| 420,979 | France | Feb. 11, 1911 |